(12) United States Patent
Castaldi et al.

(10) Patent No.: US 8,001,224 B2
(45) Date of Patent: *Aug. 16, 2011

(54) IMAGE DISPLAY DEVICE AND METHOD OF COMMUNICATING WITH AN IMAGE DISPLAY DEVICE OVER A NETWORK

(75) Inventors: Joseph Castaldi, West Linn, OR (US); Robin F. Hoeye, Canby, OR (US); Steven Thomas Hampson, Lake Oswego, OR (US)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/643,961

(22) Filed: Dec. 21, 2009

(65) Prior Publication Data

US 2010/0138509 A1    Jun. 3, 2010

Related U.S. Application Data

(63) Continuation of application No. 10/860,563, filed on Jun. 2, 2004, now Pat. No. 7,660,878.

(51) Int. Cl.
*G06F 15/177* (2006.01)
(52) U.S. Cl. .................. 709/221; 709/220; 709/222
(58) Field of Classification Search .......... 709/220, 709/221, 222, 245, 204, 219; 370/254; 713/153
See application file for complete search history.

(56) References Cited

U.S. PATENT DOCUMENTS

| | | | |
|---|---|---|---|
| 4,718,002 A | 1/1988 | Carr | |
| 5,309,563 A | 5/1994 | Farrand et al. | |
| 5,341,477 A | 8/1994 | Pitkin et al. | |
| 5,668,859 A | 9/1997 | Salimando | |
| 5,701,427 A | 12/1997 | Lathrop | |
| 5,724,510 A | 3/1998 | Arndt et al. | |
| 5,926,463 A | 7/1999 | Aheram et al. | |
| 6,161,137 A | 12/2000 | Ogdon et al. | |
| 6,233,452 B1 | 5/2001 | Nishino | |
| 6,360,256 B1 | 3/2002 | Lim | |
| 6,546,488 B2 | 4/2003 | Dillon et al. | |
| 6,625,652 B1 | 9/2003 | Miller et al. | |
| 6,830,340 B2 | 12/2004 | Olsen et al. | |
| 6,860,609 B2 | 3/2005 | Olson et al. | |
| 6,968,360 B1 | 11/2005 | Morrow et al. | |
| 6,983,324 B1 | 1/2006 | Block et al. | |
| 7,018,043 B2 | 3/2006 | Castaldi et al. | |
| 7,085,814 B1 | 8/2006 | Gandhi et al. | |
| 7,222,175 B2 | 5/2007 | Knauerhase et al. | |
| 2001/0029531 A1 | 10/2001 | Ohta | |

(Continued)

OTHER PUBLICATIONS

Pettelkau, Jeff; "Toshiba TDP-SW20 DLP Projector." Oct. 2004 [retrieved on Mar. 15, 2007] Retrieved from the Internet: <URL: http://www.jiwire.com/toshiba-TDP-SW20-wireless-projector-photo-image-gallery.htm>.

(Continued)

*Primary Examiner* — Le Luu
(74) *Attorney, Agent, or Firm* — Kilpatrick Townsend & Stockton LLP

(57) ABSTRACT

In an image display device figured to be connected to a network, a method of communicating over the network with a remote device on the network is disclosed. The method includes receiving a message sent to a multicast address on the network by the remote device, wherein the message includes an instruction to the image display device to perform a function; and performing the function instructed by the message.

30 Claims, 9 Drawing Sheets

U.S. PATENT DOCUMENTS

| | | | |
|---|---|---|---|
| 2001/0033404 A1 | 10/2001 | Escobosa et al. | |
| 2001/0033554 A1 | 10/2001 | Ayyagari et al. | |
| 2001/0034475 A1 | 10/2001 | Flach et al. | |
| 2001/0049702 A1 | 12/2001 | Najmi | |
| 2002/0012433 A1 | 1/2002 | Haverinen et al. | |
| 2002/0048275 A1 | 4/2002 | Atwater et al. | |
| 2002/0065900 A1 | 5/2002 | Dor et al. | |
| 2002/0099937 A1* | 7/2002 | Tuomenoksa | 713/153 |
| 2002/0113952 A1 | 8/2002 | Matoba et al. | |
| 2002/0147814 A1 | 10/2002 | Kimchi et al. | |
| 2002/0184311 A1 | 12/2002 | Traversat et al. | |
| 2002/0196378 A1 | 12/2002 | Slobodin et al. | |
| 2003/0017846 A1 | 1/2003 | Estevez et al. | |
| 2003/0037033 A1 | 2/2003 | Nyman et al. | |
| 2003/0061315 A1 | 3/2003 | Jin | |
| 2003/0069930 A1 | 4/2003 | Van Willigen | |
| 2003/0081561 A1 | 5/2003 | Hsiao | |
| 2003/0101294 A1 | 5/2003 | Saint-Hilaire et al. | |
| 2003/0101394 A1 | 5/2003 | Baier et al. | |
| 2003/0217123 A1* | 11/2003 | Anderson et al. | 709/219 |
| 2003/0225834 A1 | 12/2003 | Lee et al. | |
| 2003/0236831 A1 | 12/2003 | Ortiz et al. | |
| 2003/0236889 A1 | 12/2003 | Manion et al. | |
| 2004/0088367 A1 | 5/2004 | Reinke | |
| 2004/0095897 A1* | 5/2004 | Vafaei | 370/254 |
| 2004/0098456 A1* | 5/2004 | Krzyzanowski et al. | 709/204 |
| 2004/0236829 A1 | 11/2004 | Xu et al. | |
| 2006/0094456 A1 | 5/2006 | Rittle et al. | |

OTHER PUBLICATIONS

State Intellectual Property Office of China. Notice on the Second Office Action for Chinese Patent Application No. 200480022379.0. Feb. 20, 2009. China.

w3schools, "XML Elements", Apr. 2003, http://web.archive.org/web/20030417162017/www.w3schools.com/xml/xml_elements.asp, pp. 1-4.

* cited by examiner

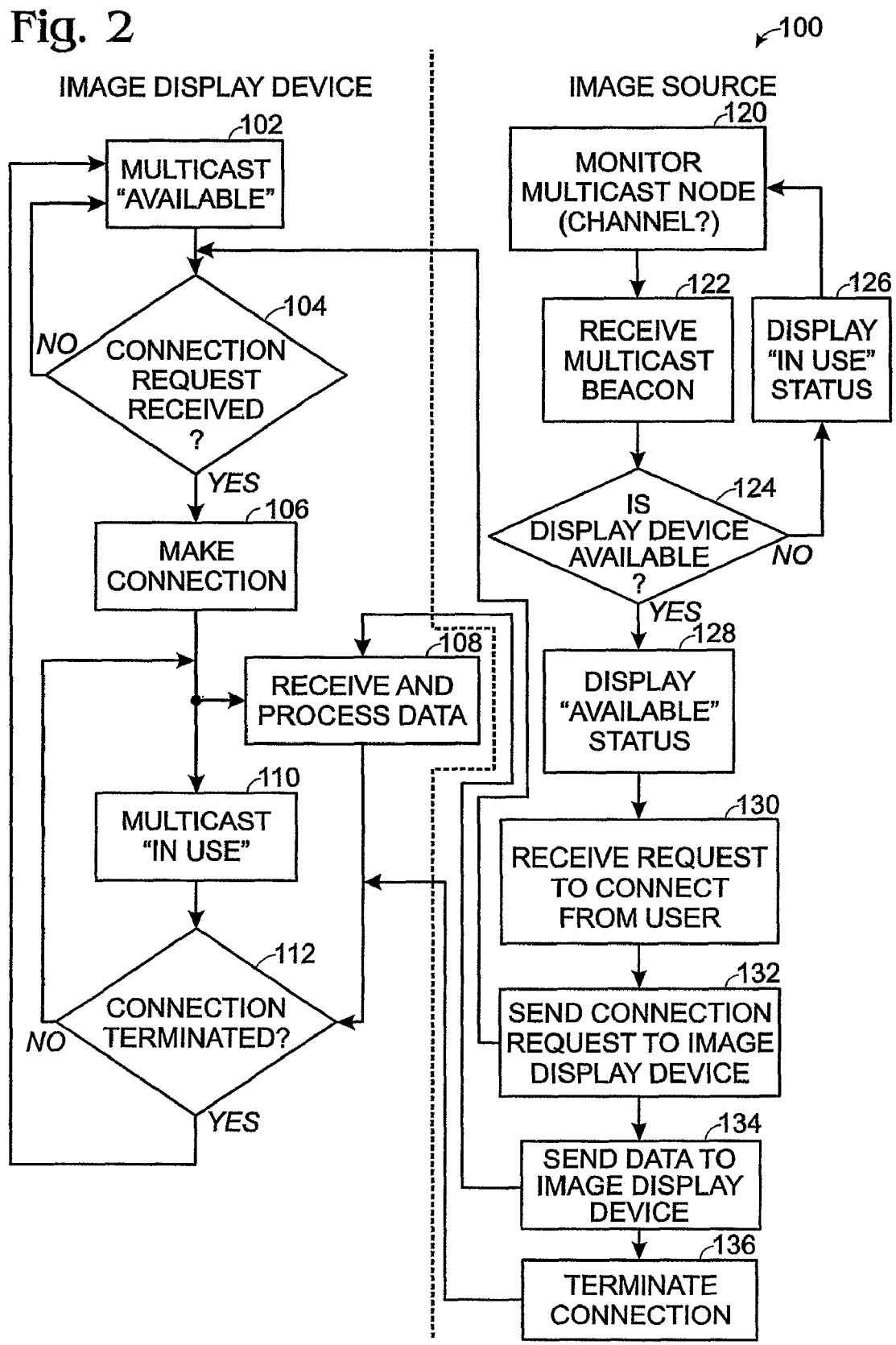

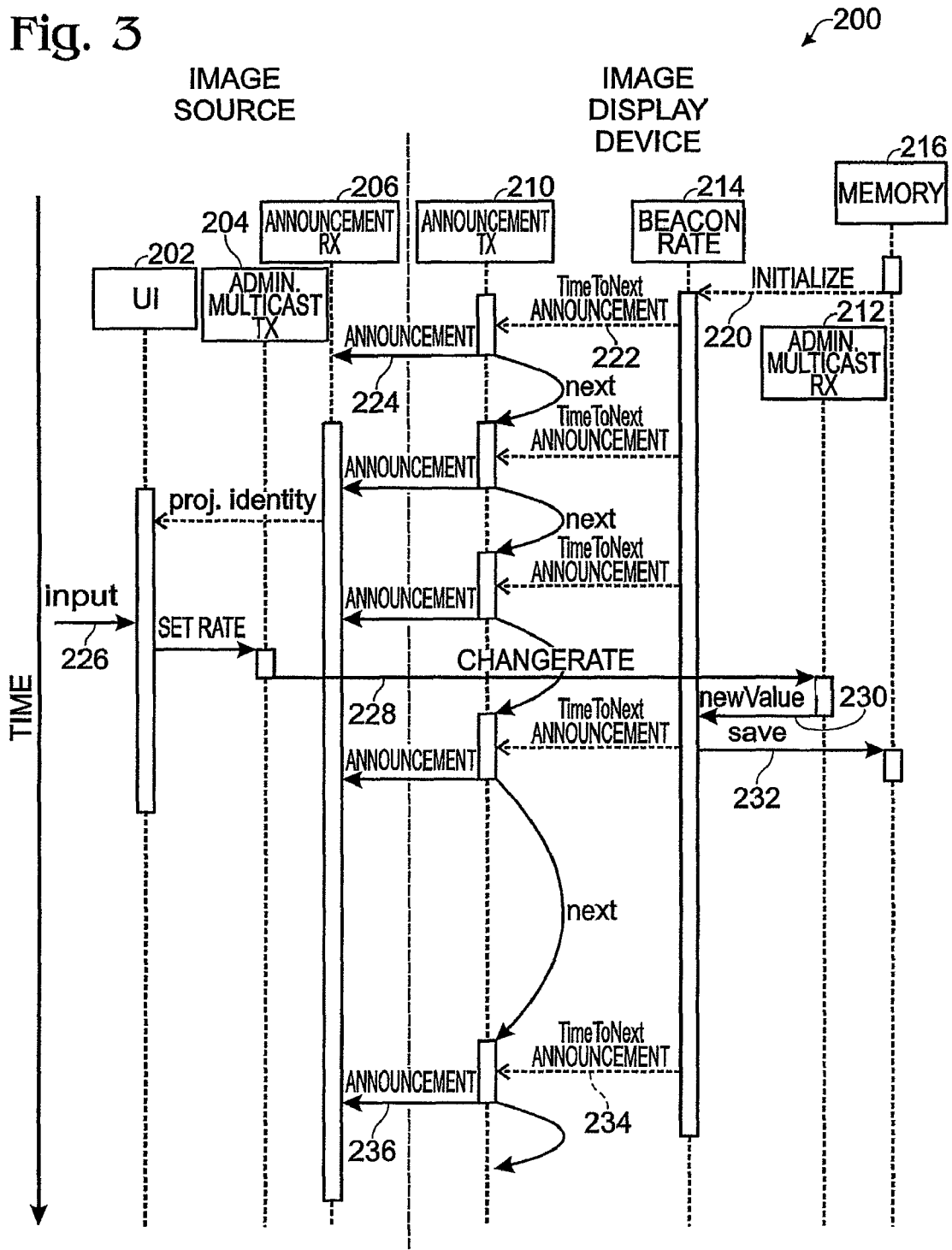

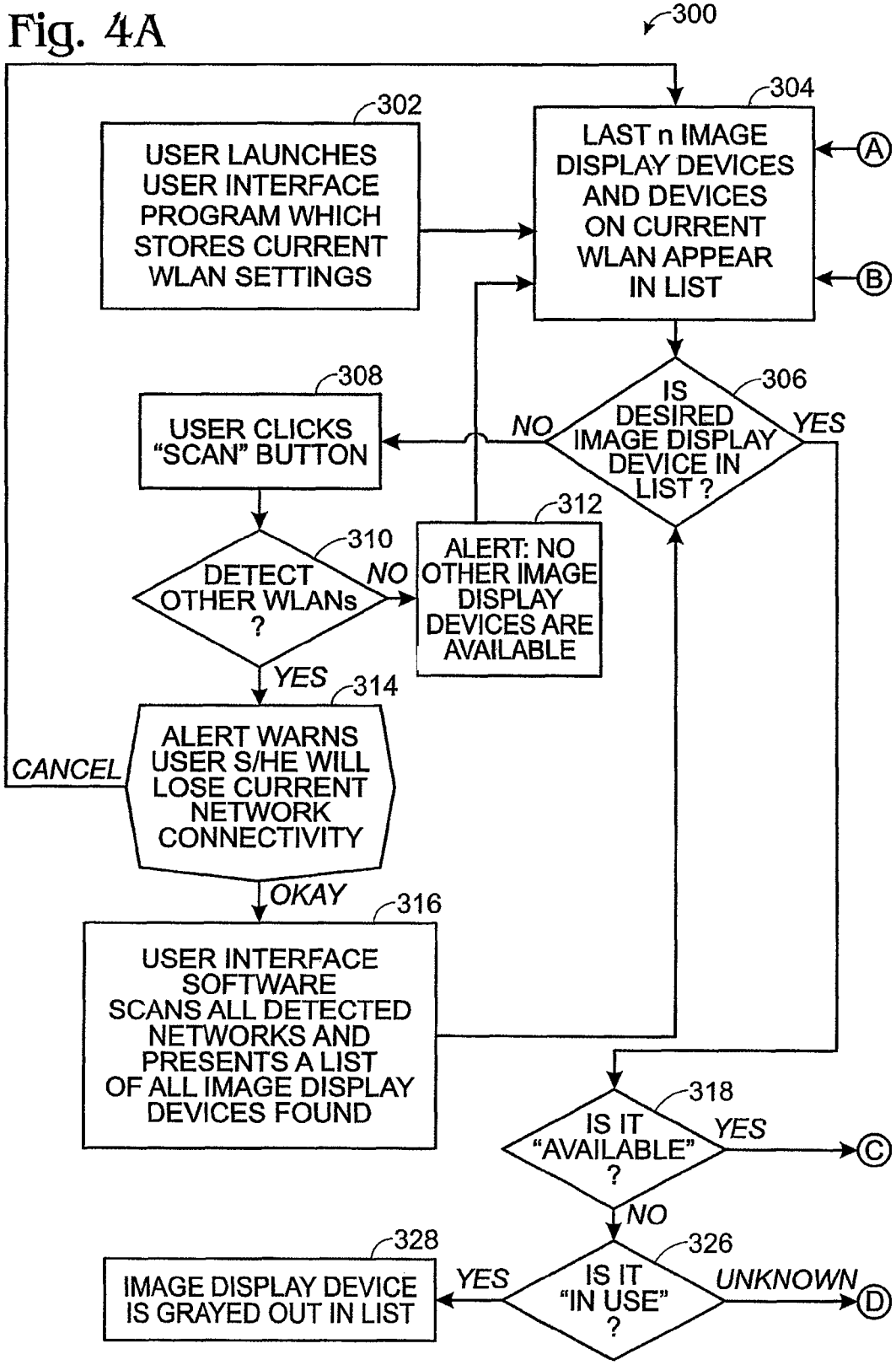

IMAGE DISPLAY DEVICE AND METHOD OF COMMUNICATING WITH AN IMAGE DISPLAY DEVICE OVER A NETWORK

CROSS REFERENCES TO RELATED APPLICATIONS

The present application claims priority to and is a continuation of U.S. patent application Ser. No. 10/860,563, Filed Jun. 2, 2004, which is a nonprovisional utility patent application based on provisional patent Application No. 60/474,871, filed Jun. 2, 2003, the teachings of which are herein incorporated by reference in their entirety for all purposes.

TECHNICAL FIELD

The embodiments disclosed herein relate generally to an image display device connectable to an image source over a network, wherein the image display device may be configured to receive multicast messages from computing devices over the network.

BRIEF DESCRIPTION OF THE DRAWINGS

The disclosure is illustrated by way of example and not by way of limitation in the figures of the accompanying drawings, in which the like references indicate similar elements and in which:

FIG. 2 is a flow diagram showing an embodiment of a method of announcing a presence of, detecting the presence of, connecting to, and sending data to an image display device over a network.

FIG. 3 is a graph showing a multicasting of an administrative message by an image source to an image display device.

FIG. 4A is a flow diagram of an embodiment of a method of selecting, connecting to and sending data to an image display device from a plurality of image display devices discovered over a network.

DETAILED DESCRIPTION

Figure 1:
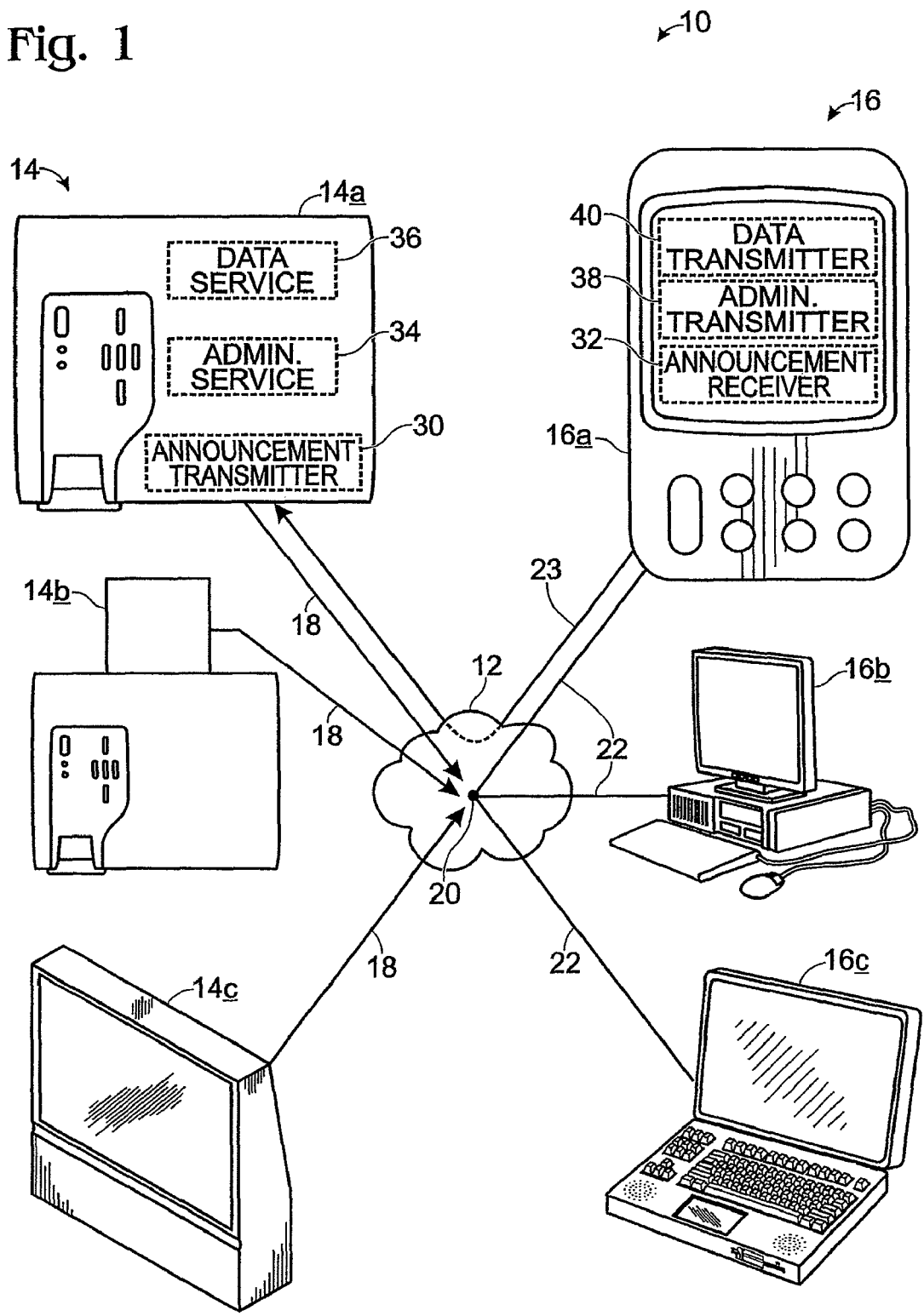
FIG. 1 is a schematic diagram of plurality of image sources and a plurality of image display devices connected to a network, illustrating a first embodiment of a method of announcing a presence of the image display devices over a network to the image sources.

FIG. 1 shows, generally at 10, an exemplary image processing and display system. System 10 includes a network 12 to which a plurality of image display devices 14 and image sources 16 are connected. Network 12 may be any suitable network, including but not limited to, a local area network (LAN), a wireless LAN (WLAN), or a wide area network (WAN). FIG. 1 shows three exemplary image display devices 14: a projection device 14a (for example, a digital projector); a projection device With a detachable image-rendering device 14b (described in more detail below) for communicating over network 12 and processing image data received over network 12; and a rear projection display device 14c. FIG. 1 also shows three exemplary image sources: a personal digital assistant (PDA) 16a; a desktop computer 16b; and a laptop computer 16c. It will be appreciated that these image display devices 14 and image sources 16 are shown merely for purposes of example, and that any other suitable image display device 14 and image source 16 may be utilized in system 10. Furthermore, while system 10 is shown having three image display devices 14 and image sources 16, system 10 may have either more or fewer image display devices 14 and/or image sources 16.

Each image display device 14 may be configured to announce its presence over the network to image sources 16. Image sources 16 may likewise be configured to detect the announcements sent by each image display device 14. In this manner, each image display device 14 may communicate whether it is available for use (or not available for use) to a user of one of image sources 16. This may facilitate the use of image display devices 14 and image sources 16 in use environments having multiple image sources and display devices, including, but not limited to, academic and corporate settings.

Each image display device 14 may be configured to announce its presence over the network to image sources 16 in any suitable manner. For example, each image display device 14 may broadcast an announcement message over the network to all devices on the network. This typically involves sending a single announcement message to a broadcast address on the network, which then sends the message to every device on the network within a preselected network distance from the broadcasting image display device 14. However, this may result in the announcement Message being sent to many network devices with no interest in receiving the announcement message, thus wasting bandwidth on the network. The term "address" as used herein may include IP addresses, MAC addresses, or any other address suitable for identifying a device on a network.

Image display devices 14 may also unicast the announcement message over network 12; i.e. send separate announcement messages to each image source 16 on the network. However, this may require significant processing power on image display devices 14, and also may require each image display device 14 to be aware of the address of each image source 16.

To more advantageously utilize the resources and bandwidth of network 12, image display devices 14 may be configured to multicast the announcement message over network 12. Where unicasting is a "one to one" protocol and broadcasting is a "one to all" protocol, multicasting is a "one to many" protocol. In multicasting, an image display device 14 sends an announcement message to a multicast address on the network, as indicated by lines 18. The multicast address is illustrated at 20 in FIG. 1. Only devices that have been configured to monitor, or receive messages from, the multicast address receive the message. This is indicated by lines 22 in FIG. 1. Thus, multicasting sends the announcement message to a potentially smaller group of network devices than broadcasting. An image source desiring to connect with the image display device may then connect directly with the image display device over the network, as indicated by line 23.

Multicasting may offer several advantages over broadcasting and unicasting announcement messages. For example, multicasting allows the announcement message to be sent to multiple image sources without the sending image display device 14 knowing the addresses of images sources 16, or without image sources 16 knowing the addresses of image display devices 14. As long as image sources 16 are configured to receive messages from the multicast address and within the multicast time-to-live scope of the transmitter, image sources 16 will receive the address. Furthermore, a plurality of image display devices 14 may send announcement messages to a single multicast node, allowing an image source 16 to receive messages from multiple image display devices 14 simultaneously.

Each image display device 14 may include an announcement transmitter, depicted schematically at 30 in FIG. 1. Announcement transmitter 30 is configured to form the announcement message, and to transmit the announcement message to one or more preselected multicast addresses 20. Each image source 16 may include an announcement receiver 32 configured to monitor one or more preselected multicast addresses 20 and receive any announcement messages sent by image sources 14 to multicast addresses 20. Announcement receiver 32 may also be configured to extract information contained within the announcement message for use both by a user of the image source, and by client programs on the image source. Examples of suitable announcement message form and content are discussed in more detail below.

While announcement transmitter 30 is shown on image display devices 14 and announcement receiver 32 is shown on image sources 16 in the depicted embodiment, it will be appreciated that announcement transmitter 30 may be on an image sources 16, and announcement receiver 32 may be on an image display device 14. In this configuration, image sources 16 announce their presence to image display devices 14, which are configured to listen for the announcements at multicast address 20. One factor that may favor having the announcement transmitter on image display devices 14 is that the image display device may likely be powered on less than the image source.

Each image display device 14 may also include one or more services available for connection with a client program or programs on image sources 16. In the depicted embodiment, image display device 14 includes an administrative service 34, and a data receiving and processing service 36. Administrative service 34 is configured to receive administrative messages from an administrative client 38, thus permitting a user of image sources 16 to change the administrative settings of image display device 14 remotely. Examples of administrative tasks that may be performed by administrative service 34 include, but are not limited to, making changes to network settings, and performing diagnostic functions. Examples of changes to network settings include, but are not limited to, setting the "friendly name" of an image display device, setting an IP address of an image display device, setting a frequency at which announcement messages are multicast by an image display device, setting an independent basic service set (IBSS) of an image display device, and setting an 802.11b operating mode for an image display device. Examples of diagnostic functions include, but are not limited to, emitting a test signal in response to receipt of a command from an image source (such as causing an LED or other display device on an image display device to flash), forcing a reboot, and returning image display device to default settings, including but not limited to original factory settings.

Data receiving and processing service 36 is configured to receive image data from an image data transmitting client 40 on each image source. For example, data receiving and processing service 36 may be configured to receive image data in a compressed format, to decompress the image data, to control the transmission of the image data from the image source, and other such functions. Data receiving and processing service 36 may include software for decompressing compressed image data of a number of formats, such as JPEG, MPEG, PDF, PNG, GIF, etc., or from a single compressed format. Where data receiving and processing service 36 is configured to decompress data from a single compressed format, data processing and transmitting client 40 may be configured to generate compressed image data files from bitmap images displayed on a screen of an image source 16.

Image display devices 14 may also include a multicast receiving service, and image sources 16 may include a multicast sending service, which are not shown in FIG. 1. The purposes of these services are described in more detail below.

Announcement transmitter 30 and announcement receiver 32 may utilize any desired protocol. The protocol may include a multicast IP address and port, a message format, and periodic limits. Furthermore, where the network is an 802.11 wireless network, the radio channel and Independent Basic Service Set (IBSS) may be the same, along with other 802.11 setup parameters. In the lack of an access point, ad hock mode is IBSS. Those nodes on the same channel and with the same spelling of 802.11 Service Set Identification (SSID) form a logical LAN segment.

As defined in RFC1112, the useable range of IP addresses for multicasting is 224.0.0.0 to 239.255.255.255, with some reserved addresses at the beginning. Also, RFC2365 defines a block of administratively scoped addresses which can be used, 239.192.0.0/14 (239.192.0.0-239.251.255.255). To lessen any likelihood of a conflict between IP addresses within a use environment, an address within this administrative scoped address block may be selected for the multicast address.

The announcement message time-to-live ("TTL") may be set to any suitable value. This parameter sets the number of router hops that the announcement message can propagate. For example, to keep the announcement message range within a local segment, the TTL may be set to 1. Alternatively, to allow the announcement message to propagate further, the TTL may be set to a greater value.

The announcement message may contain any desired information regarding the sending image display device 14. For example, the message may contain information regarding what services are available or unavailable on image display device 14. Alternatively, image display device 14 may send a separate announcement message for each service on the image display device 14. Where separate announcement messages are sent for each service, the announcement message for one service may be sent to the same multicast port, or a different multicast port, as the announcement message for the other service. Use of different multicast ports may help to avoid "port busy" errors.

The announcement message may also contain information regarding the versions of the services installed on each detected image display device 14. This may allow, for example, software or firmware on each detected image display device 14 to be updated where the version of the software or firmware is found to be older than the most recent available version.

The announcement message also may include information on how to connect to the sending image display device 14. For example, the announcement message may include a field specifying the port of the service being announced (or the port of each service, where more than one service is announced). The announcement message also may include a name of the sending image display device 14, and/or an IP address of the sending image display device 14. In some cases, the announcement message may not contain the IP address of the sending image display device. This may allow devices with more than one network interface to avoid having to send unique announcement messages for each interface. In this case, image sources 16 may include a list of image display device names and associated IP addresses so that the IP address can be determined from the name field in the announcement message.

The announcement message also may include a field indicating a time to next refresh ("TTNR") of another announcement message. This field may include, for example, a number of milliseconds (or other suitable time frame) until an image source 16 should receive another announcement message. Alternately, the announcement message may include no TTNR information.

Furthermore, the announcement message also may include a "key" field, which may be a unique identifier that allows a specific image source 16 to target a message to the sending image display device 14. In this case, each display device 14 is assigned a different "key" or identifier. In some embodiments, the key may be the MAC addresses of the image display device 14. Alternatively, in other embodiments, the key may be any other unique identifier. An image source may be configured to compare the key in the announcement message to a key or identifier stored on the image source, and to act on the announcement message only if the key in the message bears a preselected relationship to the key on the image source, such as being equal to or the same as the key on the image source.

The various information contained within the announcement message may be in the form of a record for a database. Upon receipt of an announcement message, image sources 16 may place the record in a database. If no further announcement messages are received within a multiple N times the TTRN interval, the record may be removed from the database. In this case, the image display device may be removed from a user interface, or the user interface may display the status of the image display device as "unknown." Such a user interface is described in more detail below. Furthermore, the announcement message may contain an "explicit removal" instruction that tells image sources 16 to remove the sending image display device 14 from the "available" list. This message may be sent, for example, upon receiving a power down instruction from a user.

The announcement message may be of any suitable size. For example, the announcement message may be small enough to fit within a single IP packet. Alternatively, the announcement message may be larger than one IP packet of data.

The information/record within the announcement message may be encoded in any suitable format. In one exemplary embodiment, the information within the announcement message is encoded in XML (extensible markup language) format. The use of XML offers the advantage that the scope of the description of the services within the announcement message may evolve over time without affecting earlier implementations. For example, new elements and attributes of a later implementation may be ignored by earlier implementations. Furthermore, the order of the attributes within any element may be fixed, or may be not fixed. Additionally, the XML message may or may not include PC data. Excluding PC data may improve performance, as it may allow the use of a smaller and simpler XML parser.

One abstract example of a suitable XML announcement message for announcing a single service is as follows:

```
<srvs name= "string" key= "abcd" ttnr= "integermsec" >
    <service name= "string" port= "integer" inuse = "truefalse"/>
</srvs>
```

This example XML announcement message contains a parent "srvs" element, and one child "service" child element. The parent element includes attributes giving the name of the sending image display device 14, a key for identifying the sending image display device 14 announcement transmitter 30, and a time-to-next-receipt having a millisecond value. In this example, there is only a single "service" child element having a name of "string," a port of service of "integer" and an in-use descriptor of either true or false. Where the message included information on more than one service on the sending image display device 14, more child "service" elements may be included beneath the "srvs" parent element. An example of a two-child message having actual values for the attributes is as follows:

```
<srvs key = "00E047000100" ttnr= "2000" name= "deviceone">
    <service name= "admin" port= "5002" inuse = "false"/>
    <service name= "datareceiver" port= "42345" inuse = "false"/>
</srvs>
```

If either service is currently in use, the "inuse" attribute may be changed to "true" to alert image sources 16 that the services are not currently available.

In addition to sending the announcement message on a regular, periodic interval, image display devices 14 may also be configured to send an update message to multicast address 20 whenever an element within the announcement message has a change in attribute. For example, if a user connects to one of image display devices 14, the use status of the image display device changes from "not in use" to "in use." In this case, the attribute "inuse" of the element "service" with the name attribute of "admin" changes from "false" to "true." Thus, when this happens, a partial message changing the attribute "inuse" from "false" to "true" may be sent, thus alerting image sources 16 that the sending image display device is no longer available.

While FIG. 1 depicts image sources 16 as having both admin and data transmission clients and image display devices 14 as having both admin and data processing services, it will be appreciated that other system architectures may be used. For example, in one alternate embodiment, image sources 16 may have an admin client and an image data transmission server, and image display devices 14 may have an admin server and an image data transmission client. In this embodiment, image display devices 14 may send announcement messages to the multicasting addresses regarding their presence, and image sources 16 may also send announcement messages to multicasting address 20 announcing their presence. Image display devices 14 may listen to the multicasting address, and add any image sources from which announcement messages are received to image source databases contained on the image display devices 14. Then, if a user of a selected image source 16 desires to use a selected image display device 14 to present an image, the user may direct admin client 38 on the selected image source 16 to send a message to the selected image display device 14 directing the image data receiving and processing client 34 on the selected image display device 14 to connect to the selected image source 16. The image data and processing client 40 on the selected image display device 14 would then control transmission of the image data from the selected image source 14 to the selected image display device 16, and would receive instructions from the user of the selected image source 16 via the admin service.

Next, FIG. 2 shows, generally at 100, a flow diagram of an embodiment of a method for sending an announcement message from an image display device 14, receiving the announcement message at an image source 16, forming a connection between image display device 14 and image source 16, and transmitting image data and/or administrative commands between image source 16 and image display device 14. FIG. 2 is first described in the context of events occurring at image display device 14, and then in the context of events occurring at image source 16.

First, image display device 14 sends a multicast announcement message at 102 to a multicasting address on network 12. The multicast announcement message sent at 102 may announce that image display device 102 is available for connection. The multicast announcement message may also include other information regarding the status of image display device 14, information regarding how to connect to image display device 14 (for example, the services available on the IP address of the image, the port of service for each available service, etc.), information regarding the time to the next transmission of the announcement message, and any other suitable information, as described above. Image display device 14 then waits at 104 to receive a connection request from any image sources 16 that received the multicast message and wish to connect.

If no connection request is received, then image display device 14 continues to periodically multicast the announcement message at 102 and wait for a connection request. If a connection request is received, then image display device 14 makes a connection, at 106, to image source 16 over the network and begins receipt and processing of data at 108. While busy receiving and processing data, the image display device 14 also may send, at 110, an announcement message to multicast address 20 stating that the image display device 14 is currently in use. Image display device 14 may periodically send the "in use" announcement message to multicast address 20 until the connection between image display device 14 and image source 16 is terminated at 112. Once the connection is terminated at 112, image display device may begin anew by multicasting the "available" announcement message again at 102.

FIG. 2 also shows events occurring at image source 16. First, image source 16 monitors, at 120, multicast address 20 on network 12. When image display device 14 sends the announcement message to the multicast address, image source 16 receives, at 122, the announcement message, as long as the image source has been instructed to receive messages from that particular multicast address and port.

Upon receiving the announcement message, image source reads the message at 124 to determine whether image display device 14 is "available" or "in use." If image display device 14 is "in use," then image source 16 may display this status to a user via a user interface, as indicated at 126.

On the other hand, if image display device 14 is "available," then the status of image display device 14 may be shown on a user interface on image source 16 as "available," as indicated at 128 in FIG. 2. If a user chooses to request to connect to image display device 14, the user may enter the request at the image source (for example, via a keyboard or mouse), as indicated at 130. The request to connect is then sent directly to image display device 14 and 132, either from the IP address of image display device 14 contained within the announcement message, or from an image display device name (or other identifier) contained within the announcement message that is matched to an IP address list maintained on image source 16.

If a connection is successfully made to image display device 14, then image source 16 sends, at 134, image data and/or administrative commands over the connection, for receipt and processing (and, in the case of image data, display) by image display device 14. Once the user is finished using image display device 14, the connection may be terminated at 136.

As mentioned above, image sources 16 may also be configured to communicate with image display devices 14 via multicasting. For example, an image source 16 may be configured to multicast its name, IP address, and/or other information to image display devices 14 so that image display devices may populate a list or database of image sources currently available. In this case, image display devices 14 may have a multicast receiving service configured to receive multicast messages from multicast address 20 (or other multicast address on network 12) sent by image sources 16. This may allow changes to be made to image display devices 14 without forming a direct connection between an image source 16 and an image display device 14 over network 12.

For example, where it is desired to make a single administrative change to all image display devices on a selected network or subnet, the single change could be sent simultaneously to all of the image display devices via multicasting, instead of having to form a connection to each device. Furthermore, where it is desired to send an administrative message to a single image display device via multicasting, the administrative message sent to the multicast address may include a key that identifies the intended target of the administrative message. Additionally, image display devices 14 may be configured to process multicast administrative messages only where the messages include the correct identifying key (for example, where the identifying key is the same as or equal to the key on the target device). In this manner, multicast messages sent by image sources 16 may be used to change administrative settings only on targeted image display devices. This may be particularly helpful in setting administrative settings on devices with minimal on-board user interfaces, such as image-rendering device 14*b*, described in more detail below.

The multicast administrative message sent by image sources 16 may have any suitable format. For example, the message may take the form of an XML message, wherein the "key" is an attribute of an element in the XML message. The XML message may make the administrative change by sending a value for every administrative setting on image display device 14, or by sending values for only those elements changed. An abstract example of an XML message containing a new value for a single administrative setting is as follows.

```
<admin_multicast id="integer" key= "key" returnAddress= "IPaddr"
port = "port">
    <elementname value= "string"/>
</admin_multicast>
```

Where the XML message resets more than one setting, the other settings may be encoded as additional child elements beneath the "admin_multicast" root element.

Yet another format for an administrative multicasting message in XML format is to include "set" and "get" commands directed to individual XML paths using Xpath to respectively change and query current administrative settings. An abstract example is as follows:

```
<admin_multicast id="integer" key= "key" returnAddress= "IPaddr"
port = "port">
    <set path = "specific-path" value= "string"/>
    <get path = "specific-path"/>
</admin_multicast>
```

An example of a specific administrative multicast command message of this form is as follows, which changes the IP address of the target image display device. In this example, the attribute "IP address" is changed, and the action requires a password.

```
<admin_multicast id="integer" key= "key" returnAddress= "IPaddr"
port = "port">
    <set path = "root/system/IPaddress" value= "10.0.0.3"
password = "passwd"/>
</admin_multicast>
```

Other commands besides "get" and "set" may also be supported. Examples of other commands include, but are not limited to, commands intended to test the multicasting administrative services on image display devices 14 by causing a setting to change for a brief time (i.e. a "flash"), and a reboot command forcing an image display device 14 to reset into a freshly powered-on state.

It will be appreciated that any of the XML doclets shown above may also include a password element or attribute to provide a password to a security feature on the receiving device.

Other formats besides XML may also be used for multicast messages sent from image sources 16 to image display devices 14, for example, a binary encapsulation which includes data bits. Such a message format may utilize an acknowledgement and retry scheme (commonly known as Automatic Retry Request, "ARQ") to ensure exactly one delivery of each message to the target. For example, a message in a binary format may include a header, a length field setting forth the length of the message (either including or not including the header), a document identification assigning a unique identification to the message, a "key" targeting the message to a specified image display device 14, a port (or other network location information) to which a response to the command is to be sent by the image display device, etc. The use of a unique document identification in the message may allow the image display device or devices receiving the message to sense a duplicate message, and thus to ignore duplicate messages.

In response to the receipt of a targeted message, an image display device may return a brief acknowledgement that the message was received. For example, such an acknowledgement may include the unique document identification of the message received by the image display device to confirm receipt of the message.

FIG. 3 shows, generally at 200, a timeline of the communications between services within image display device 14 and image source 16, and between image display device 14 and image source 16, during an exemplary message multicasting process. Image source 16, shown on the left in FIG. 3, includes a user interface 202, an administrative message multicast transmitter 204, and an announcement message receiver 206. Image display device 14, shown on the right, includes an announcement message transmitter 210, and an administrative message multicast receiver service 212. Image display device 14 also includes an announcement rate value 214 contained in memory, and non-volatile memory 216 including, among other information, initial or default settings for various image display device functions. Other services on image display device 14, such as data receiving and processing service 32 and administrative service 34, are not shown for purposes of clarity.

As indicated at 220, FIG. 3 begins with an initialization or restore of the default announcement rate, which is the frequency that image display device 14 sends announcement messages. Announcement message transmitter 210 obtains the announcement rate from announcement rate setting 214, as indicated by line 222, and then transmits announcement messages periodically to image source 16 (via multicast address 20) over network 12, as indicated at 224. Image source 16 receives the announcement message at announcement message receiver 206, and may display information regarding image display device 14 on user interface 202.

At some point, user interface 202 receives an input from a user, as indicated at 226, requesting image display device 14 to change the frequency at which it sends the announcement message. The user interface transfers this request to administrative multicast transmitter 204, which multicasts the administrative message over network 12. Image display device 14 receives the transmitted administrative multicast message at administrative multicast receiver 212. Image display device 14 then reads the announcement message, extracts the new announcement rate setting at 230, and saves the new announcement rate setting at 232 in non-volatile memory 216 so that the new announcement rate setting 214 will be persistent. The new announcement rate setting is also communicated to announcement transmitter 210. As a result, a longer period of time passes until announcement transmitter 210 transmits the next announcement message. These steps are typically performed by administrative service 34.

As described above, image sources 16 may receive announcement messages from more than one image display device 14. Thus, an image source 16 may be configured to present a selection of detected image display devices 14 to a user of the image source 16, and to permit the user to select a desired available image display device for the presentation of image data. Furthermore, image sources 16 may also be configured to remember a last N number of image display devices 14 used, whether or not those image display devices 14 are currently detected. Moreover, image sources 16 may be configured to scan for more than one WLAN, and then to receive announcement messages on each detected WLAN.

Figure 4B:
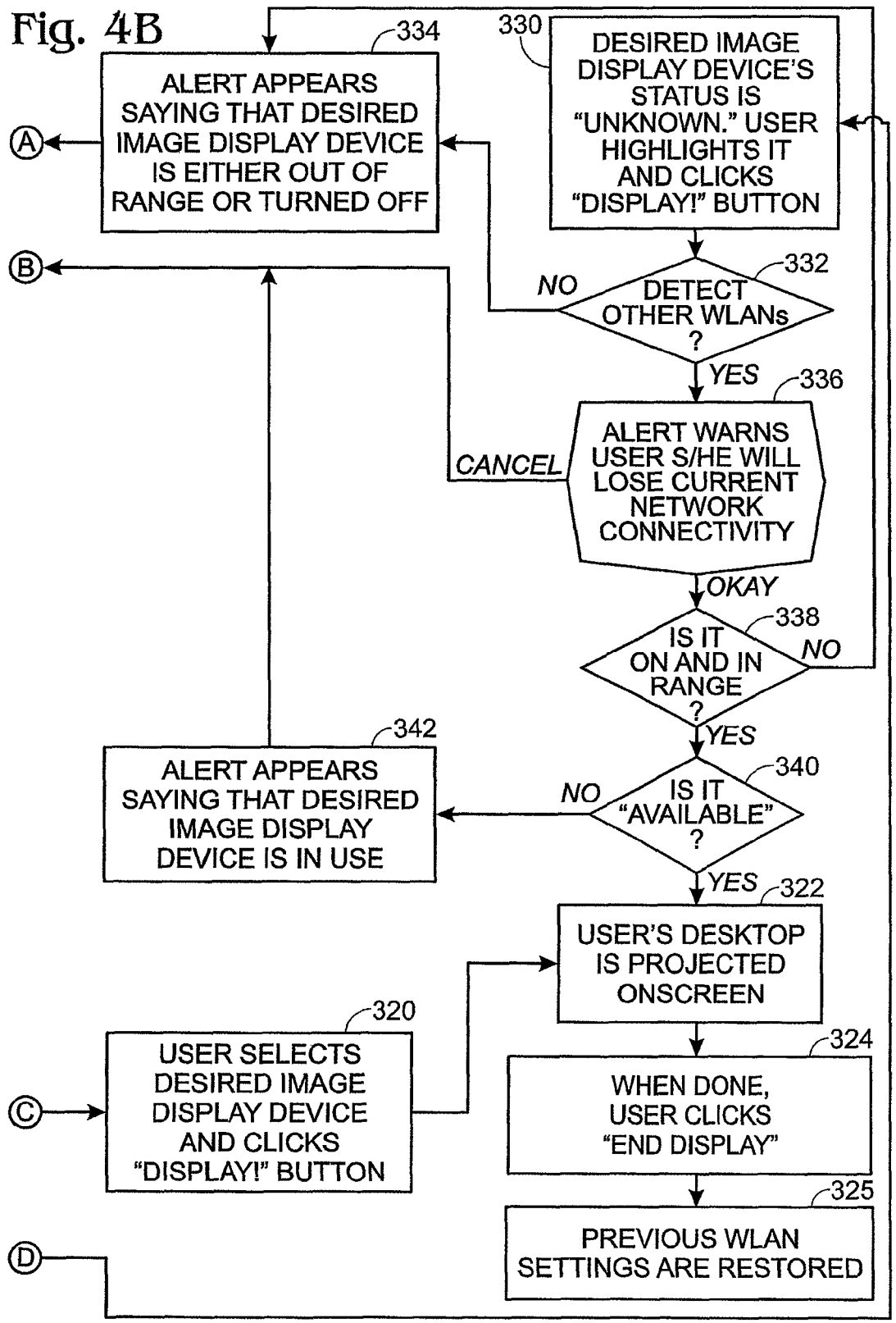
FIG. 4B is a continuation of the flow diagram of FIG. 4A.

FIGS. 4A and 4B show, generally at 300, one embodiment of a suitable method of allowing a user to discover, select and connect to an image display device 14 over a WLAN. It will be appreciated that method 300 may employ the announcement and discovery methods and systems discussed earlier herein. First, at 302, the user launches the user interface program on image source 16. Upon launch, the user interface program may detect and save the current WLAN settings on the user's computer so that they may be restored once the user has completed transmitting data to a selected image display device 14.

Next, at 304, the user interface program may display a list of image display devices 14 from which the user may select a desired image display device 14 with which to display a presentation. The list of image display devices 14 may include the last N number of image display devices 14 accessed by the user's computer, or the image display devices 14 currently detected over the WLAN, or both.

Next, the user may examine the list of image display devices at 306 to determine whether a desired image display device 14 is on the list. If the desired image display device 14 is not shown on the list, then the desired image display device 14 may be connected to a WLAN other than the one to which the user's computer is currently connected. In this case, the user may select at 308 to scan to detect any other WLANs on which the desired image display device 14 may be located.

If no other WLANs are detected at 310, the user interface program may alert the user at 312 that no other WLANs are available. At this point, the user may return to the list of image display devices presented to the user at 304 to begin the image display device 14 selection process anew.

If, however, other WLANs are detected at 310, the user may desire to scan the other WLANs to continue searching for the desired image display device. Thus, at 312, the user is given the option of attempting this scan. If the user opts to perform the scan, the user may be alerted that the scan will result in the loss of connectivity to the current WLAN.

If the user decides at this time not to connect to scan the other WLANs, the user may cancel this operation and return to the list of image display devices presented at 304. On the other hand, if the user elects at this point to connect to another of the detected WLANs, the user interface program scans all detected WLANs at 316. Any image display devices discovered in this scan is then added to the list of image display devices presented to the user at 304, and the user may again examine the list at 306 for a desired image display device.

The list of image display devices presented to the user may include information regarding the status of each discovered image display device. For example, the list may show whether each listed image display device 14 is on the current WLAN or another WLAN, and/or whether each listed image display device 14 is currently in use.

Figure 5:
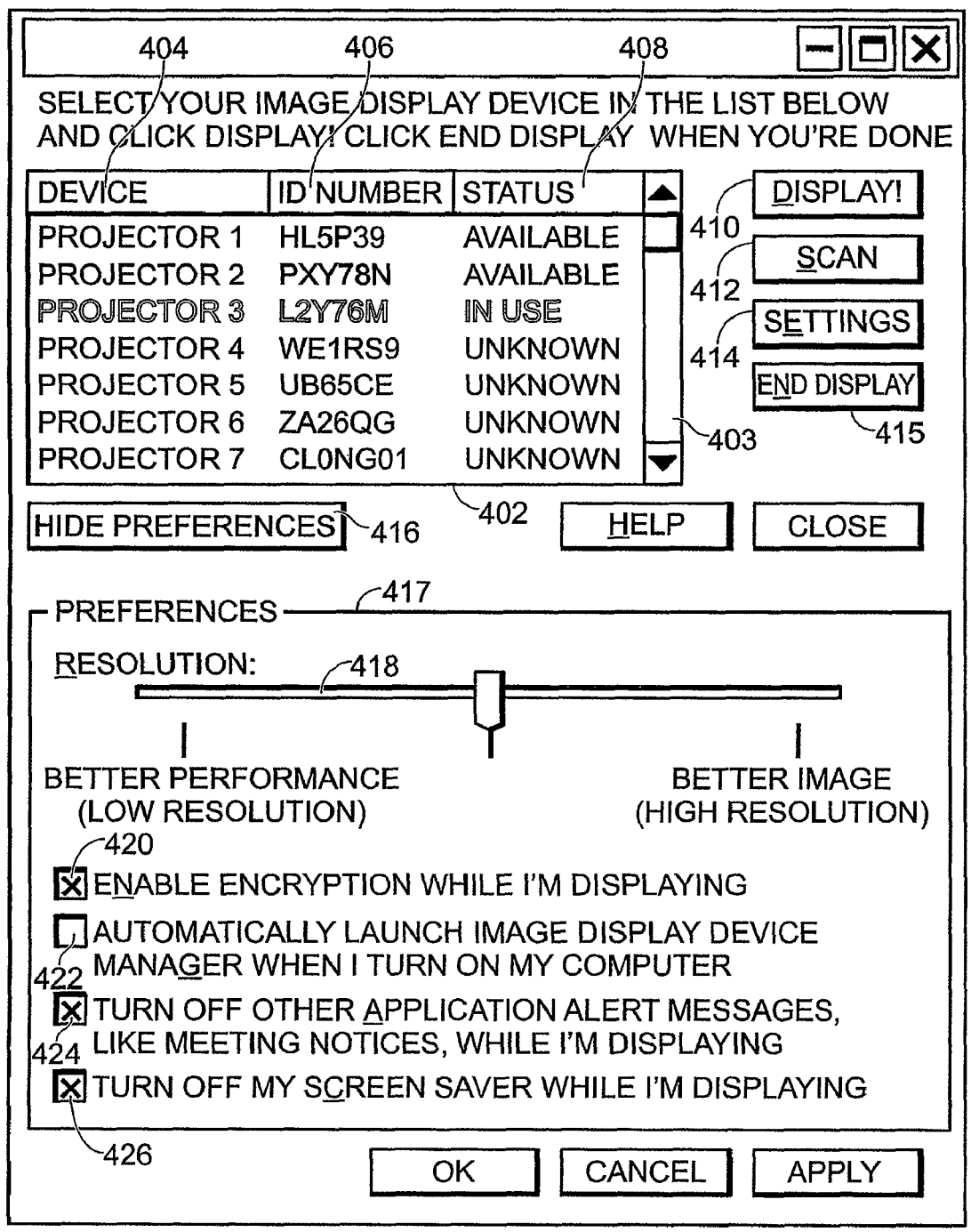
FIG. 5 is a view of an exemplary embodiment of a user interface for displaying discovered image display devices to an image source user.

The list of image display devices may be presented to the user in any suitable format. An example of a suitable format is shown in FIG. 5 as image display device list window 400. Image display device list window 400 includes a listing field 402 in which all image display devices detected (shown herein as projectors) are presented to the user. Listing field 402 may include a scroll bar 403 to allow more image display devices to be listed in the field than can be viewed in the field at one time.

The individual image display device 14 listings in listing field 402 may include any desired information regarding an image display device, and may be arranged in any suitable manner. For example, listing field 402 may include an identification name column 404 in which each image display device is identified to the user by its common name. Listing field 402 may also have an identification number column 406 in which the serial number or other identification number of each detected image display device 14 is listed.

Additionally, listing field 402 may have a status column 408 that gives information regarding the status of each detected image display device. For example, if an image display device 14 is on the same WLAN as the user's computer, the user's computer may detect whether the image display device 14 is currently being used by another user, or whether the image display device 14 is available for use. Where a selected image display device 14 is currently in use, the user interface program may indicate this by showing the words "in use" in the status column next to the selected image display device. Likewise, where the selected image display device 14 is not in use, the word "available" may be shown in the status column. On the other hand, where the selected image display device 14 is on a different WLAN than the one to which the user's computer is currently connected, the word "unknown" may be shown in the status column next to the selected image display device, indicating that the user interface program is unable to determine the status of the selected image display device 14 at that time.

Next, image display device list window 400 may include one or more buttons to allow a user to perform specific operations within the user interface program. For example, image display device list window 400 may include a "display" button 410. A user may present a presentation via a desired image display device 14 by first selecting an image display device in listing field 402, and then selecting the "display" button 410. This operation is described in more detail below. Image display device list window 400 may also include a "scan" button 412 which may be selected by a user to scan for image display devices 14 on other WLANs besides the one to which the user's computer is currently connected. Furthermore, image display device list window 400 may include other control buttons, such as a settings button 414 for changing image display device settings over the WLAN, and an "end display" button 415 that ends a display session, and that may disconnect the image source 16 from the image display device 14.

Image display device list window 400 may also be configured to allow a user to control other computer features from inside of the user interface program environment. For example, image display device list window 400 may include a preferences button 416 that may be selected to selectively reveal and hide a preferences sub-screen 417. Preferences sub-screen 417 may include such controls as a resolution control 418 that allows a user to adjust compression characteristics of the compression algorithm to balance desired speed and image quality characteristics. Preferences sub-screen 417 may also include controls allowing a user to enable encryption during displaying 420, to automatically launch the user interface program at computer start-up 422, to turn off other alert message applications during displaying 426, and to turn off screen saver programs during displaying 428.

As mentioned above, resolution control 418 may be configured to allow a user to adjust the compression algorithms used to compress the transmitted images. The user may do so by adjusting the position of resolution control 418. The selected position of resolution control 418 may be configured to trigger a predetermined combination of compression algorithms. For example, in a first region of the resolution control 418 (where it is labeled "better image"), the resolution control may be configured to turn off lossy compression algorithms, such as a RGB-YCrCb color space transformation, and utilize only a lossless compression algorithm, such as an LZO compression algorithm. Likewise, this position may be configured to cause the image to be displayed at a high screen resolution, such as 1024×768 pixels (XGA).

On the other hand, moving resolution control 418 to the other end of its range (where it is labeled "better performance") may cause either the color space transformation to be used alone, or in combination with the LZO compression. Furthermore, this slider position may also be configured to cause the image to be displayed at a lower resolution than XGA, such as 800×600 pixels (SVGA). The positions of resolution control 418 between these two extremes may be configured to cause any combination of these techniques to be used that yields a proportional increase/decrease in performance/resolution.

Referring again to FIG. 4A, if a user finds at 306 that the desired image display device 14 is in the list of discovered image display devices 14, the user may try to select the desired image display device 14. However, before allowing the user to use the image display device, the user interface program first checks at 318 to determine whether the desired image display device 14 is available, meaning whether the image display device 14 is both on the current WLAN and not in use by another user. If the desired image display device 14 is available, then (referring again to FIG. 4b), the user may highlight the desired image display device 14 and then select, at 320, the "display" button 410. This may activate the image data compression and transmission client, causing image data to be compressed and transmitted to the image display device 14. The user's screen is displayed by the selected image display device 14 until the user selects at 324 a "stop display" control (not shown), which ends the display session and may close the user interface program. At this point, the computer's previous WLAN settings may be restored at 325.

Referring again to FIG. 4A, if the desired image display device 14 is not determined to be "available" at 318, then it is determined at 326 whether the image display device 14 is "in use." If the image display device 14 is determined to be "in use," the identification of the image display device 14 may be shown in a different color, font, size, or other appearance characteristic in listing field 402 compared to the other image display devices shown in the listing field. This indicates to the user that that particular image display device 14 may not be selected.

If, however, it is determined at 326 that the use state of the desired image display device 14 is unknown, this indicates that the desired image display device 14 may be on a different WLAN than the one to which the user's computing device is currently connected. In this case, referring again to FIG. 4A the user may attempt to use the image display device 14 by selecting the image display device 14 and then selecting "display," as shown at 330. This may prompt the user interface program to attempt to detect other WLANs at 332. If no other WLANs are detected at 332, then an alert may be displayed to alert the user that the desired image display device 14 is either out of range or turned off, as shown at 334. Then, the user may again examine the list of image display device 14 shown at 304 to select another desired image display device.

On the other hand, if other WLANs are detected at 332, then the user interface program may connect to the other WLANs to search for the selected image display device 14 on the other WLANs. Before connecting, the user may be alerted at 336 that the current network connection will be lost while the user interface program searches for the selected image display device. At this point, the user may choose to cancel the search. If the user so chooses, the user may be directed back to the list of image display devices shown at 304 to select another desired image display device.

If the user does not choose to cancel, then the user interface program disconnects from the current WLAN and connects to other detected WLANs to locate the desired image display device. If the desired image display device 14 cannot be found, then the desired image display device is determined at 338 either to be off or out of range, and the user may be alerted as such at 334.

If the desired image display device 14 can be found, the user interface program next determines whether the desired image display device 14 is "available" at 340, meaning that it is not being used by another user. If the desired image display device 14 is in use, then the user may be alerted of its status at 342, and may then be directed to the list of image display devices shown at 304 to select another desired image display device 14. If, however, the desired image display device 14 is determined to be "available," then the image source 16 is connected to the image display device 14, and the user may display a presentation as described above for steps 322, 324 and 325. Where multiple image display devices 14 are connected to a single LAN (or WAN, WLAN, or any other type of network) software and/or firmware on each image display device 14 may be updated over the network from a single computer. For example, the user interface program may have an "update" functionality that manages software and/or firmware updates. The "update" functionality may detect all image display devices 14 on the current network that are turned on and available via the announcement and detection systems and methods described earlier herein. The "update" functionality may also detect various aspects of the status of the image display devices 14, including, but not limited to, the version number of any software and/or firmware stored on the image display devices 14.

Figure 6:
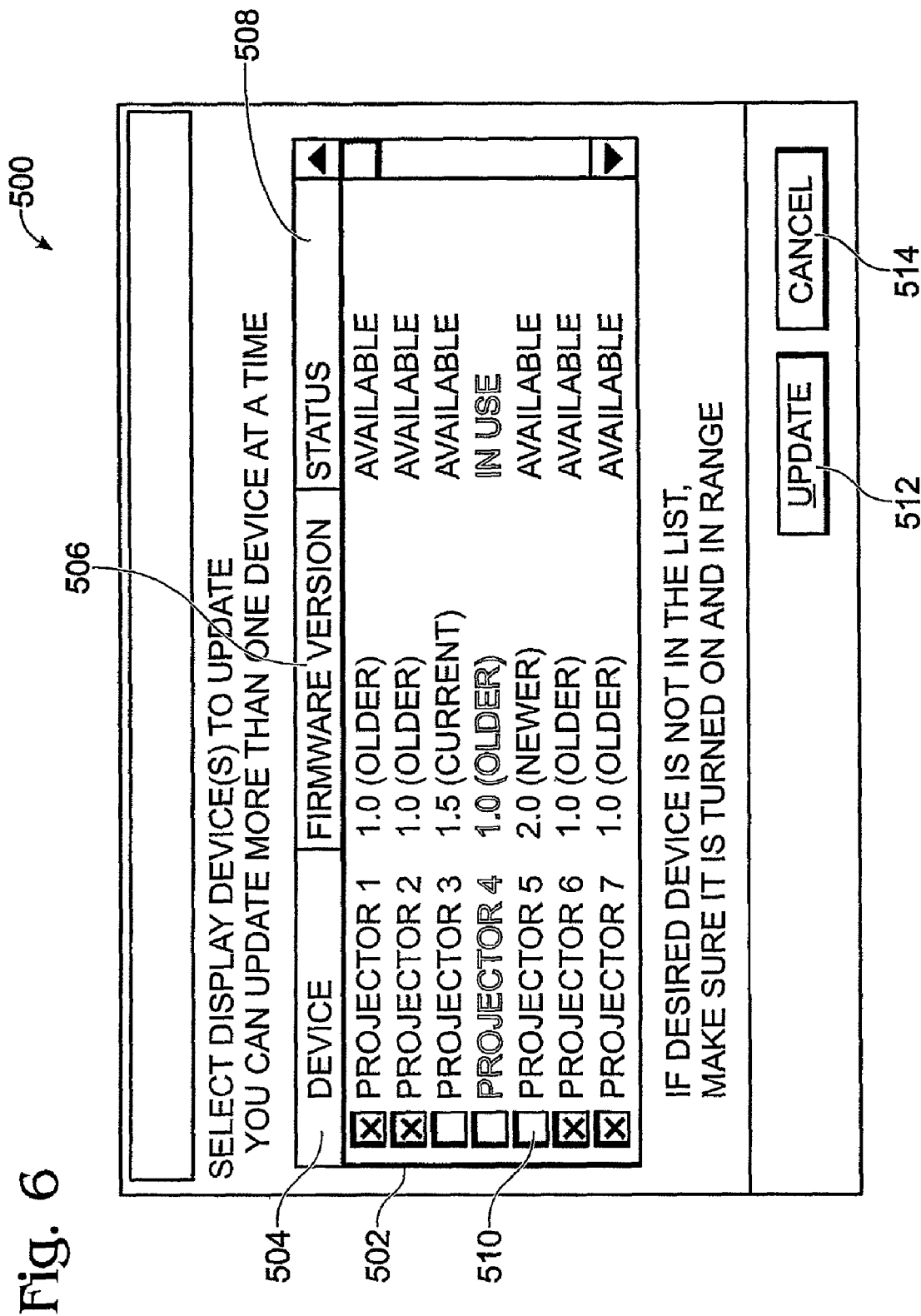
FIG. 6 is a view of an exemplary embodiment of a user interface for displaying information regarding a version of firmware on a discovered image display device to an image source user.

The user interface program may next display the list of the detected image display devices 14 to a user. This list may be displayed in any suitable manner, and may contain any desired information regarding the identity and status of each detected image display device 14. FIG. 6 shows an example of a suitable update interface window generally at 500. Update interface window 500 includes a listing field 502 containing a list of all image display devices 14 detected on the current network, arranged by name in a column 504. Alternatively, the image display devices 14 may be identified by serial number, conference room name or number, etc.

Listing field 502 also may show a version number (or other identifier) of the firmware and/or software currently installed on each detected image display device 14, as indicated at 506. The depicted listing field 502 shows only a firmware version for each image display device 14. However, it will be appreciated that the listing field may show a software version, or a both a software and a firmware version. Additionally, listing field 502 may show whether a detected image display device 14 is in use, as indicated at 508.

Next, to update the firmware and/or software, a user may first select the image display devices 14 that the user desires to update via a checkbox 510 associated with each listed image display device 14. For example, in the depicted embodiment, the user may wish to update only those image display devices 14 which are running the oldest firmware version. Thus, the user may select projectors 1, 2, 6 and 7 by checking the box next to each of these image display devices 14. The user is not able to select projector 4 because it is indicated to be in use. Next, the user may simply select the update button 512 to begin updating the firmware on each listed image display device 14. Alternatively, a user may cancel the updating process simply by selecting a "cancel" button 514. After the updating process has been completed, the user interface program may update the list shown in FIG. 11 by indicating whether the update was successful or unsuccessful under status column 508 (not shown).

As mentioned above in reference to FIG. 1, some image display devices 14 may be image-rendering devices 14b configured to be removably attached to other display devices, such as digital projectors, for communicating over network 12 and receiving and processing image data sent over network 12. Such detachable image-rendering devices may allow a wide variety of image sources to be used with a single projection device.

Figure 7:
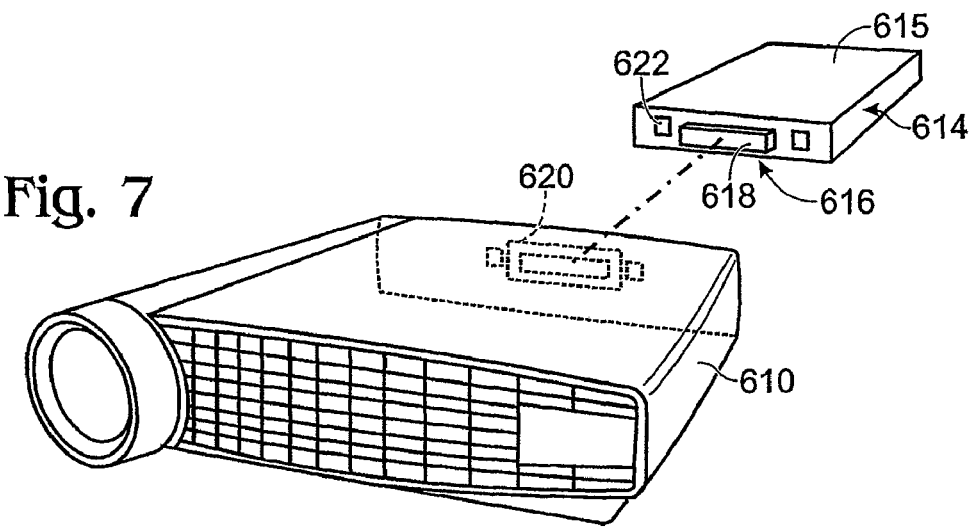
FIG. 7 is a perspective view of exemplary embodiments of a projection device and a detachable image-rendering device.

FIG. 7 shows a perspective view of an exemplary embodiment of an image-rendering device, generally at 614, configured to be removably attached to an image projector or visual presentation projector 610 for the transfer of images from image-rendering device 614 to image projector 610. Image-rendering devices 614 is adapted to receive image data from a plurality of different sources, to process the image data into a form useable by image projector 610, and to automatically transmit the processed image data to image projector 610 for presentation. While image-rendering device 614 is shown in FIG. 7 in the context of a digital projector 610, it will be appreciated that image-rendering device 614 may be configured for use with any other suitable image display device.

Image-rendering device 614 includes a body 615 having a projector connecter 616. Projector connector 616 functions to couple image-rendering device 614 to image projector 610. Projector connector 616 further functions to transmit or transfer the projectable image data to image projector 610. As illustrated in FIG. 7, projector connector 616 may include a plug 618 that is adapted to be received into a corresponding receptacle 620 in image projector 610, permitting image-rendering device 614 to directly engage or plug into image projector 610. Attachment structures, including latches 622, projections, pins, tabs, braces, screws or other suitable supports, may be used to retain image-rendering device 614 within receptacle 620. Alternatively, instead of an integral connector, projector connector 616 may be attached to projector 610 in a remote fashion via a cable and suitable plug (not shown).

Any suitable plug may be implemented. One example of a suitable projector connector is a standard video plug. Use of a standard video plug may enable image-rendering device 614 to be used on a variety of image projectors having a standard outlet. For example, projector connector 16 may be a Video Electronics Standard Association (VESA) M1 plug that corresponds to an M1 standard video interface, which is available on numerous image projectors. For example, the M1 plug may be any display receptacle interface, such as, but not limited to, a digital connector, e.g. an M1-D connector, an analog connector, e.g. an M1-A connector, or a digital and analog connector, e.g. an M1-DA connector.

Image-rendering device 614 may utilize any suitable power supply. For example, projector connector 616 may include a power supply enabling image-rendering device 614 to draw power from connector 616. An example of such a projector connector is the VESA M1 plug described above. Furthermore, projector connector 16 may be capable of supporting both analog and digital display requirements.

Figure 8:
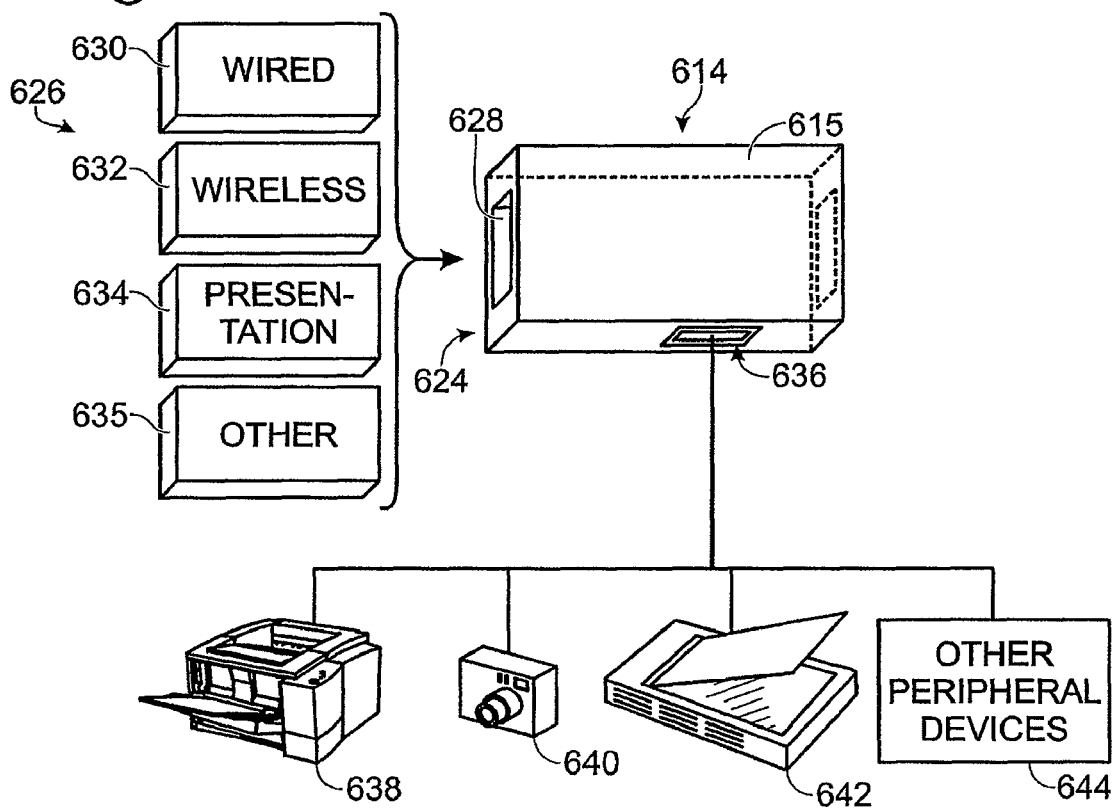
FIG. 8 is a schematic view of the image-rendering device of the embodiment of FIG. 7.

Turning now to FIG. 8, image-rendering device 614 may be understood in more detail. Specifically, body 615 of image-rendering device 614 may include at least one image receiver 624 configured to receive a plurality of different data transfer devices 626, examples of which are depicted at 630, 632, 634 and 635. Each data transfer device is adapted to provide an image, presentation, slide or other type of data to be transferred to image-rendering device 614 from an independent source, e.g. an external computing device or a mass storage device. An external computing device, as discussed in more detail below, includes any suitable computing device, including, but not limited to, a personal computer, a desktop computer, a laptop computer, a handheld computer, etc.

Data transfer devices 626 enable image-rendering device 614 to receive images from multiple sources. Data transfer device 626 may be a card, an expansion board, an adapter or other suitable device that is adapted to be plugged into a slot 628 within image-rendering device 614. It should be noted that slot 628 is configured to enable different cards to be quickly and easily inserted and removed from image-rendering device 614. Slot 628 may be of a suitable size, such that standard-sized cards may be inserted, or adapted to be inserted, into slot 28.

Any number of different data transfer devices 626 may be interchangeably received within slot 628. For example, data transfer device 626 may be a network interface card, such as a wired network card, indicated schematically at 630, or a wireless network card, indicated schematically at 632. Specifically, wired network card 630 may include an IEEE 802.3 standard wired local area network (LAN) interface card, e.g. Ethernet, 100BASE-T standard (IEEE 802.3u) or fast Ethernet, IEEE 802.3z or gigabit Ethernet, and/or other suitable wired network interface. Wireless network card 632 may include a wireless LAN card, such as IEEE 802.11a, 802.11b, 802.11g, 802.11x, a radio card, a Bluetooth radio card, a ZigBee radio, etc.

Each network interface card, regardless of type, enables communication between image-rendering device 614 and an independent source, e.g. a remote computer, server, network, etc. This communication allows an image or presentation stored on the independent source to be transmitted to image-rendering device 614.

Slot 628 may also be configured to accept other types of data transfer devices. For example, data transfer device 626 may be a presentation card, indicated schematically at 634. Presentation card 634 may be any suitable type of mass storage device. For example, presentation card 634 may be a memory card, a flash memory card, a solid-state memory card, a hard disk, etc. A user may insert a presentation card having a prestored presentation into image receiver 624. The prestored image may then be automatically transferred to image projector 610. Alternatively, a User may be able to navigate a menu displayed on the viewing surface in order to select a presentation. Such a configuration may be especially helpful if more than one presentation is stored on the presentation card. Image receiver 624 may also be configured to accept any other suitable image storage and/or transfer device, as indicated at 635.

Software may be provided within image-rendering device 614 to enable the device to convert and render prestored images into projectable images. For example, software may be provided in the device to enable a prestored presentation to be presented With dynamic graphics and other animations. Specifically, presentations may be stored in a primitive graphical format and/or in a compressed format and decompressed or otherwise rendered by image-rendering device 614 into a projectable image.

A further application for use of a presentation card within image-rendering device 614 may be best illustrated with reference to a standard digital camera. Typically, standard digital cameras include some type of memory device, such as a non-volatile memory card, or other mass storage device, that stores digital pictures. Image receiver 624 may be configured to receive such a memory device such that the pictures stored in the memory card and/or mass storage device may be presented by image projector 610. Furthermore, image-rendering device 614 may be configured to render the images from the memory card to simulate a slide show. Additionally, it should be noted that a user may be able to order, animate, insert transitions and/or otherwise alter the pictures when presenting the slide show.

Image-rendering device 614 further may include at least one peripheral device connector 636 on body 615. Peripheral device connector 636 is configured to enable at least one peripheral device to be operably linked to image-rendering device 614 to enable images to be transferred from a peripheral device to image projector 610 or vice versa. Peripheral connector 636 may be any suitable connector. For example, peripheral connector 636 may be a standard connector, such as a Universal Serial Bus (USB) port, IEEE 1394 port, parallel port, e.g. enhanced parallel port (EPP), extended capabilities port (ECP), etc. It should be noted that more than one peripheral connector may be provided on body 615.

As illustrated, any number of peripheral devices may be coupled to image-rendering device 614 via peripheral connector 636. Exemplary peripheral devices may include, but are not limited to, printers 638, cameras 640, scanners or document cameras 642 and other peripheral devices 644. As discussed above, images may be transferred from any one of the peripheral devices to image projector 610 or vice versa. In this manner, scanned images may be transferred to image-rendering device 614 and projected onto an image projection surface via image projector 610. Similarly, pictures residing within camera 640 may be transmitted directly from camera 640 to image projector 610 and projected onto an image projection surface. Additionally, a projected image or presentation may be relayed back through image-rendering device 614 and printed by printer 638.

Figure 9:
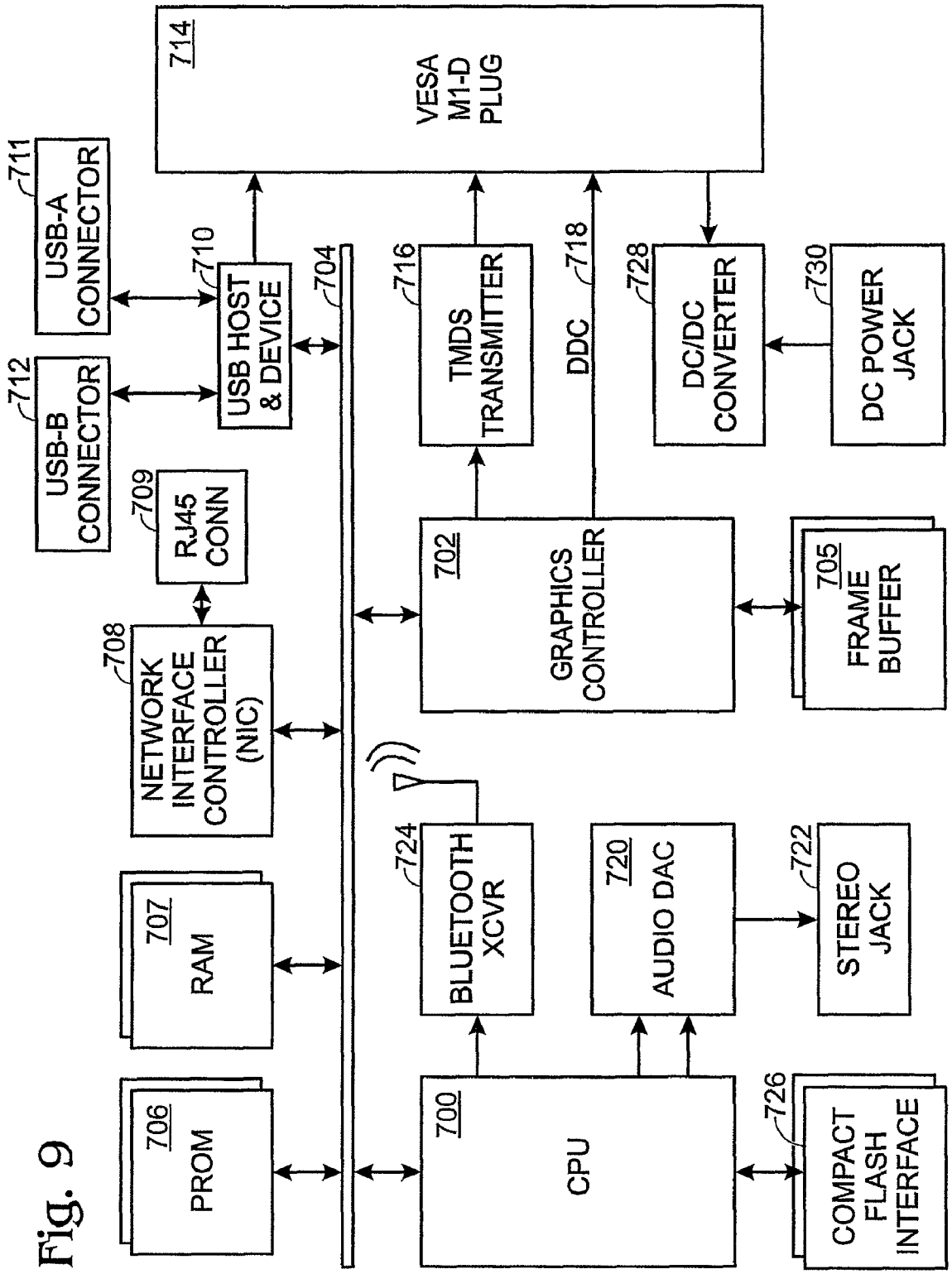
FIG. 9 is a block diagram of an exemplary embodiment of an electrical system of the image-rendering device of FIG. 7.

FIG. 9 illustrates a block diagram of an exemplary electrical and logic system for one embodiment. It should be noted that this diagram is for illustrative purposes, and is not intended to be limiting in any sense. Specifically, image-rendering device 614 includes a processor 700 connected to a graphics controller 702 via a bus 704. Graphics controller 702 is adapted to process and produce images that may be projected by image projector 610. Buffer 705 is linked directly to graphics controller 702 and provides temporary memory for graphics controller 702. Image-rendering device 614 further includes memory, such as programmable read-only memory (PROM) 706 and random access memory (RAM) 707, linked to processor 700 and graphics controller 702 by bus 704. PROM 706 and RAM 707 may be utilized to store a set of instructions executable by graphics controller 702 to process and produce the projectable image data for projector 610. Other types of memory may also be utilized.

Peripherals, including a network interface card 708 (including connector 709) and USB host 710, are further linked to processor 700 and graphics controller 702 by bus 704. USB host 710 may be linked to USB-A connector 711 and/or USB-B connector 712 and may be further linked directly to the M1-D plug 714. It should further be noted, that graphics controller 702 may be linked to M1-D plug 714 via an analog interface and/or a transition minimized differential signaling (TMDS) transmitter 716. Graphic controller 702 display data channel 718 is linked to M1-D plug 714 via a display data channel 718.

Additionally, an audio converter is illustrated at 720 with attached stereo jack 722 to allow audio output through external speakers and/or internal speakers. Provision is made for accommodation of a Bluetooth radio card via a Bluetooth transceiver 724. A compact flash interface 726 is also provided to allow a compact flash card or other data transfer device, such as 630, 632, 634 and 635 shown in FIG. 8, to be inserted and used within slot 628.

As described above, image-rendering device 614 may be powered from the VESA M1 interface from the image projector via M1-D plug 714 or other similar device. A power converter 728 may be further utilized within the system. Alternatively, power may be provided via power jack 730.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A computer-implemented method embodied in a computer readable storage medium storing a computer program, for use in a computing device configured to be connected to a network to which an image display device is connected, the computer program comprising instructions executable to perform a function, comprising:

forming a message to send to the image display device, wherein the message includes an instruction directing the image display device to perform the function and an identifier associated with the image display device; and sending the message to a multicast address on the network where the image display device performs the function when the identifier in the message has a preselected relationship to an image display device identifier associated with the image display device.

2. The computer-implemented method embodied in a computer readable storage medium of claim 1, wherein the function is to change a network address of the image display device.

3. The computer-implemented method embodied in a computer readable storage medium of claim 1, wherein the function is to change a rate at which the image display device multicasts an announcement message over the network.

4. The computer-implemented method embodied in a computer readable storage medium of claim 1, wherein the function is to set an 802.11 independent basic service set of the image display device.

5. The computer-implemented method embodied in a computer readable storage medium of claim 1, wherein the function is to reboot the image display device.

6. The computer-implemented method embodied in a computer readable storage medium of claim 1, wherein the function is to return administrative settings on the image display device to default settings.

7. The computer-implemented method embodied in a computer readable storage medium of claim 1, wherein the message is a single IP packet.

8. The computer-implemented method embodied in a computer readable storage medium of claim 1, wherein the preselected relationship includes a relationship in which the identifier in the message is the same as the unique identifier associated with the image display device.

9. The computer-implemented method embodied in a computer readable storage medium of claim 1, wherein the unique identifier is the same as or part of a media access control address of the image display device.

10. The computer-implemented method embodied in a computer readable storage medium of claim 1, further comprising not performing the instruction if the identifier does not have the preselected relationship to the unique identifier.

11. The computer-implemented method embodied in a computer readable storage medium of claim 1, wherein the message includes XML content.

12. A computer-implemented method embodied in a computer readable storage medium storing a computer program, for use in a computing device configured to be connected to a network to which an image display device is connected, the computer program comprising instructions executable to perform a function, comprising:

receiving a message sent to a multicast address on the network by the remote device, wherein the message includes an instruction to the image display device to perform a function and an identifier, comparing the identifier in the message to a unique identifier associated with the image display device; and performing the function instructed by the message when the identifier in the message has a preselected relationship to the unique identifier associated with the image display device.

13. The computer-implemented method embodied in a computer readable storage medium of claim 12, wherein the function is to change a network address of the image display device.

14. The computer-implemented method embodied in a computer readable storage medium of claim 12, wherein the function is to change a rate at which the image display device multicasts an announcement message over the network.

15. The computer-implemented method embodied in a computer readable storage medium of claim 12, wherein the function is to reset an 802.11 independent basic service set of the image display device.

16. The computer-implemented method embodied in a computer readable storage medium of claim 12, wherein the function is to reboot the image display device.

17. The computer-implemented method embodied in a computer readable storage medium of claim 12, wherein the function is to return administrative settings on the image display device to default settings.

18. The computer-implemented method embodied in a computer readable storage medium of claim 12, wherein the message is a single IP packet.

19. The computer-implemented method embodied in a computer readable storage medium of claim 12, wherein the preselected relationship includes a relationship in which the identifier in the message is the same as the unique identifier associated with the image display device.

20. The computer-implemented method embodied in a computer readable storage medium of claim 12, wherein the unique identifier is substantially similar to a media access control address of the image display device.

21. The computer-implemented method embodied in a computer readable storage medium of claim 12, further comprising not performing the instruction if the identifier does not have the preselected relationship to the unique identifier.

22. The computer-implemented method embodied in a computer readable storage medium of claim 12, wherein the message includes XML content.

23. A computer-implemented method embodied in a computer readable storage medium storing a computer program, for use in a computing device configured to be connected to a network to which an image display device is connected, the computer program comprising instructions executable to perform a function, comprising:

forming a message to send to the image display device, wherein the message includes an instruction directing the image display device to perform the function wherein the message includes an identifier targeting the message to a specific image display device, and wherein the image display device is configured to compare the identifier in the message to a unique identifier associated with the image display device; and sending the message to a multicast address on the network.

24. The computer-implemented method embodied in a computer readable storage medium of claim 23, wherein the function is to change a network address of the image display device.

25. The computer-implemented method embodied in a computer readable storage medium of claim 23, wherein the function is to change a rate at which the image display device multicasts an announcement message over the network.

26. The computer-implemented method embodied in a computer readable storage medium of claim 23, wherein the function is to reset an 802.11 independent basic service set of the image display device.

27. The computer-implemented method embodied in a computer readable storage medium of claim 23, wherein the function is to reboot the image display device.

28. The computer-implemented method embodied in a computer readable storage medium of claim 23, wherein the function is to return administrative settings on the image display device to default settings.

29. The computer-implemented method embodied in a computer readable storage medium of claim 23, wherein the message is contained within a single IP packet.

30. The computer-implemented method embodied in a computer readable storage medium of claim 23, wherein the message includes XML content.

* * * * *